United States Patent [19]

Tezuka

[11] Patent Number: 4,864,445
[45] Date of Patent: Sep. 5, 1989

[54] HEAD LOADING MECHANISM FOR RECORDING AND/OR REPRODUCING APPARATUS

[75] Inventor: Nobuo Tezuka, Kanagawa, Japan

[73] Assignee: Canon Kabushiki Kaisha, Tokyo, Japan

[21] Appl. No.: 145,655

[22] Filed: Jan. 13, 1988

Related U.S. Application Data

[63] Continuation of Ser. No. 778,383, Sep. 20, 1985, abandoned.

[30] Foreign Application Priority Data

Sep. 21, 1984 [JP] Japan ................. 59-197866

[51] Int. Cl.$^4$ ................. G11B 21/08; G11B 21/02
[52] U.S. Cl. ................. 360/105; 360/106; 360/78.04; 358/909; 369/215
[58] Field of Search ................. 360/97, 99, 104, 105, 360/106

[56] References Cited

U.S. PATENT DOCUMENTS

| 4,241,366 | 12/1980 | Nishida et al. | 360/105 |
| 4,423,449 | 12/1983 | Hasegawa | 360/105 X |
| 4,466,034 | 8/1984 | Newberry | 360/106 |
| 4,590,529 | 5/1986 | Nikaido et al. | 360/106 |

FOREIGN PATENT DOCUMENTS

| 1774204 | 1/1970 | Fed. Rep. of Germany . |
| 2155124 | 5/1972 | Fed. Rep. of Germany . |

Primary Examiner—Stuart N. Hecker
Assistant Examiner—Alyssa H. Bowler
Attorney, Agent, or Firm—Toren, McGeady & Associates

[57] ABSTRACT

A recording and/or reproducing apparatus includes a recording and/or reproducing head; a head control device for moving the head along a recording surface of a medium and for shifting the head into condition away from the surface of the medium; a drive source for driving head control device; and a holding device for holding the head in the condition.

31 Claims, 2 Drawing Sheets

HEAD LOADING MECHANISM FOR RECORDING AND/OR REPRODUCING APPARATUS

This is a continuation of application Ser. No. 778,383, filed Sept. 20, 1985 abandoned 2/18/88.

BACKGROUND OF THE INVENTION

1. Field of the Invention

This invention relates to a recording and/or reproducing apparatus, and more particularly a head control mechanism arranged to change a recording or reproducing position on a flexible record bearing medium by shifting a recording and/or reproducing head along the recording surface of the record bearing medium with a head shifting device.

2. Description of the Prior Art

There have been known various apparatuses of the kind for recording and/or reproducing information via a magnetic head onto a disc-shaped flexible magnetic sheet which is employed as a record bearing medium.

In the magnetic recording and/or reproducing apparatus of the above-stated kind, contact between the magnetic sheet and the magnetic head plays an important role. The term "contact" as used herein includes a case where the magnetic sheet and the magnetic head confront each other across a thin layer of air developed by the rotation of the sheet. Inadequate contact of the sheet and the head causes a loss called a "spacing loss", which hinders recording or reproduction on or from the magnetic sheet. The degradation of the recording or reproducing condition due to the spacing loss is attributable much to the deformation of the magnetic sheet as well as a scar or dust on the magnetic sheet. In the event of deformation of the magnetic sheet, not only the deformed part of the sheet is affected thereby, but also the whole magnetic sheet sometimes vibrates during its rotation. If the vibration excessively takes place during the rotation, the magnetic head might be damaged in addition to a drop in the input or output level of the apparatus during a recording or reproducing operation.

The deformation of the magnetic sheet is not only caused by an external force, such as touching of a finger, but also takes place when the magnetic head and the sheet are left in contact with each other over an excessively long period of time with the recording and/or reproducing apparatus loaded with the sheet and stopped its operation. In the event of excessively long contact, the sheet might stick to the head to damage both of them when the sheet begins to rotate under such a condition.

To prevent such deformation of the magnetic sheet or sticking between the sheet and the head, there has been proposed an apparatus which is arranged to bring the magnetic sheet and the magnetic head into contact with each other only at the time of recording or reproduction. This arrangement not only prevents the above-stated troubles but also lengthens the serviceable lives of the magnetic sheet and the magnetic head. While this arrangement is very effective for the solution of the problems of deformation, etc., of the magnetic sheet, the recording and/or reproducing apparatus of this type uses an additional drive source such as a plunger or the like for effecting change-over between the contact and non-contact states of the magnetic sheet and the magnetic head. This causes an increase in size of the whole apparatus. Besides, the drive source results in additional energy consumption and also necessitates complex sequence control during recording or reproduction.

Therefore, the above-stated arrangement using an additional drive source for change-over between contact and non-contact states of the magnetic sheet and the magnetic head is not suited for a portable and compact magnetic recording and/or reproducing apparatus such as a magnetic recording camera that must be small in size with reduced energy consumption.

SUMMARY OF THE INVENTION

Such being the problems with the prior art apparatuses, it is a general object of the present invention to provide a novel recording and/or reproducing apparatus which is capable of eliminating the above-stated problems.

It is a more specific object of this invention to provide a recording and/or reproducing apparatus which is capable of preventing the deformation of a flexible record bearing medium from being caused by a recording or reproducing head with a relatively simple structural arrangement and without having recourse to any additional drive source.

Under these objects, according to an aspect of the present invention, a recording and/or reproducing apparatus using a flexible record bearing medium having a recording surface, comprises a recording and/or reproducing head, a head moving mechanism for moving the head along the recording surface of the medium, a drive source for the head moving mechanism, and a head retiring mechanism operative with the driving force of the drive source to retire the head from the recording surface of the medium.

In this case, the retiring mechanism (or a retracting device) is preferably arranged to retract the head from the medium when the apparatus comes to a non-recording or non-reproducing state. The retiring mechanism is further arranged to have the head released from the retired or retracted state thereof in response to an operation for recording or reproduction. Further, the retiring mechanism is preferably so arranged that the head is retracted when the head is moved by the head moving mechanism.

These and further objects and features of this invention will become apparent from the following description of embodiments thereof taken in connection with the accompanying drawings.

DETAILED DESCRIPTION OF THE PREFERRED EMBODIMENTS

Figure 1:
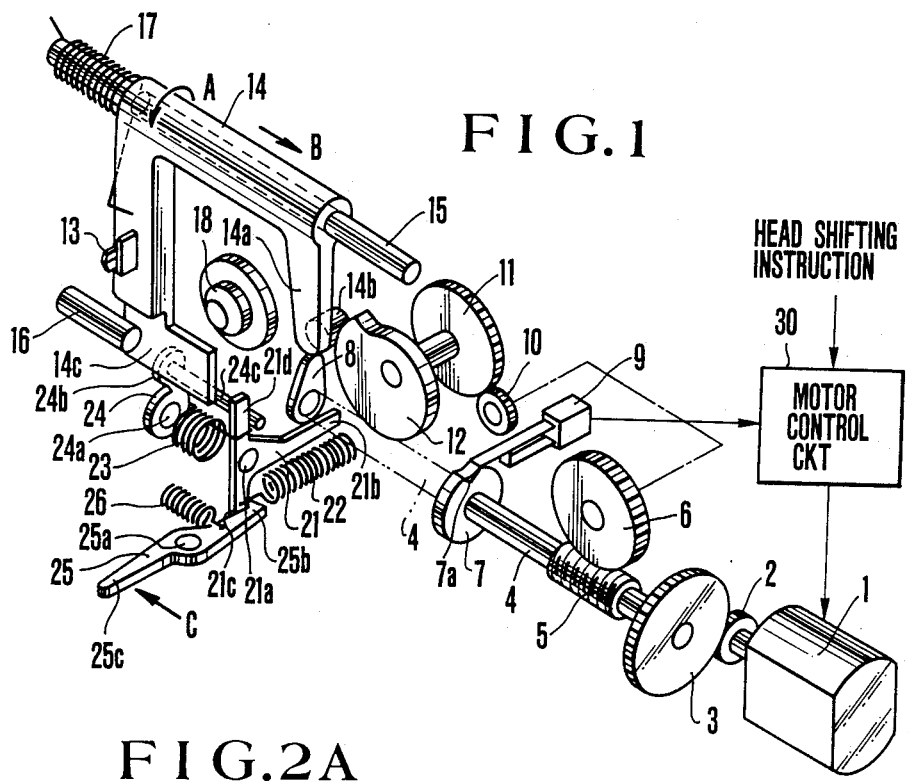
FIG. 1 is an oblique view showing the essential parts of an embodiment of this invention.

Referring to FIG. 1, an embodiment of this invention is arranged as follows: A head feeding motor 1 is arranged to move a head carrier or carriage 14 which has a magnetic head 13 mounted thereon. The driving force of the motor 1 is arranged to be transmitted to a shaft 4 via gears 2 and 3. The shaft 4 is provided with a worm gear 5, a switch control cam 7 and a charge cam 8 which are arranged in one unified body with the shaft 4. A rotation control switch 9 is arranged as follows: With the motor 1 caused to begin to rotate by a motor control circuit 30, when the above-stated control cam 7 has made just one turn, the switch 9 is turned on by a recess 7a of the cam 7 to generate thereby a motor stop signal.

A worm wheel 6 engages with the above-stated worm gear 5. The rotation of the worm wheel 6 is transmitted via a gear 10 to another gear 11. This gear 11 is connected to a head feeding cam 12, which turns to a predetermined degree when the above-stated shaft 4 makes one turn.

The magnetic head 13 is mounted on the head carriage 14 as mentioned above. There are provided guide rails 15 and 16. The head carriage 14 is movable along the guide rail 15 and is pivotally carried by the guide rail 15 to be turnable thereon. An arm part 14a of the head carriage 14 is provided with a cam follower 14b, which is arranged to be in sliding contact with the head feeding cam 12.

A spring 17 has one end thereof connected to the head carriage 14 and the other end to a stationary part such as a chassis which is not shown. The spring 17 exerts a turning force on the head carriage 14 to urge it to turn counterclockwise in the direction of arrow A on the guide rail 15. At the same time, this spring 17 applies a pushing force to the head carriage 14 urging it to move along the guide rail 15 or in the direction of arrow B. As a result, the cam follower 14b and the head feeding cam 12 are kept in contact with each other. The above-stated turn of the cam 12 to the predetermined degree as a result of one turn of the shaft 4 is arranged to cause the head carriage 14 to move, for example, to an extent corresponding to one recording track pitch of a magnetic recording sheet.

A spindle 18 is arranged to cause the magnetic sheet 31 to rotate. During a recording or reproducing operation, a motor, which is not shown, causes the spindle 18 to rotate at a predetermined speed. The magnetic sheet 31 is provided with a center hub which is arranged to be attached to the spindle 18 in mounting the sheet 31. A T-shaped lever 21 is urged by a spring 22 to turn counterclockwise on a shaft 21a. Under the condition shown in FIG. 1, the second arm part 21c of the lever 21 is engaging with the claw part 25b of a clamp lever 25. The first arm part 21b of the lever 21 is arranged to be capable of abutting on the above-stated charge cam 8. When the cam 8 is caused to make one turn by the shaft 4, the first arm part 21b is pushed by the cam 8 to cause the lever 21 to turn clockwise on the shaft 21a against the force of the spring 22. This results in the condition as shown in FIG. 1. A clamp lever 25 is urged by a spring 26 to turn counterclockwise on a shaft 25a. The claw part 25b, which is formed at the fore end of the lever 25, engages with the second arm part 21c of the T-shaped lever 21.

A lift lever 24 is arranged to be turnable on a shaft 24a. The fore end part 24b of the lever 24 is arranged to abut on the reverse side of one end 14c of the head carriage 14. The lift lever 24 is provided with a pin 24c which is arranged to abut on the third arm part 21d of the T-shaped lever 21.

A torsion spring 23 has one end thereof engaged with the third arm part 21d of the T-shaped lever 21 and the other end with the lift lever 24, respectively. The torsion spring 23 is thus arranged to urge the lift lever 24 to turn counterclockwise and the lever 21 to turn clockwise in such a manner that these levers 21 and 24 are normally kept like one body.

Figure 2A:
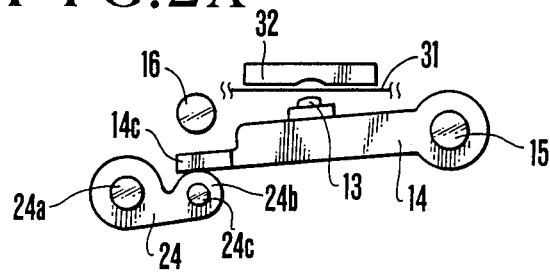
FIGS. 2A and 2B show the position of the head of the same embodiment of FIG. 1 in a state of being out of contact with a magnetic recording sheet, and in another state of being in contact with the sheet.

The embodiment which is arranged in this manner operates as follows:

FIG. 2A shows the parts around the magnetic head 13 in the state of FIG. 1. Referring to FIG. 2A, the illustration includes a magnetic sheet 31 and a stabilizer plate 32 which is arranged to stabilize the magnetic sheet 31 relative to the head 13. As shown, the head carriage 14 is in a state of having been turned counterclockwise on the guide rail 15 by the urging force of the spring 17. One end 14c of the head carriage 14 is in contact with the fore end part 24b of the lift lever 24. Under this condition, the magnetic head 13 is out of contact with the magnetic sheet 31.

Figure 2B:
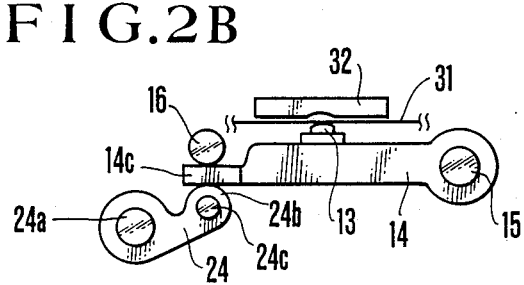

Next, when one end 25c of the clamp lever 25 is pushed in the direction of arrow C in FIG. 1, the claw part 25b of the lever 25 is disengaged from the second arm part 21c of the T-shaped lever 21. Then, the urging force of the spring 22 causes the T-shaped lever 21 to turn counterclockwise. This in turn causes, via the spring 23 and the pin 24c, the lift lever 24 also to turn counterclockwise. In this instance, the turning force of the lift lever 24 caused by the spring 22 is arranged to be larger than the force of the spring 17 exerted via the head carriage 14 on the lift lever 24. Therefore, as shown in FIG. 2B, the head carriage 14 turns clockwise on the shaft 15. One end 14c of the head carriage 14 then comes to abut on the guide rail 16. Under the condition as shown in FIG. 2B, the magnetic head 13 is in contact with the magnetic sheet 31 to permit a recording or reproducing operation of the apparatus.

Upon completion of the recording or reproduction, a head shifting instruction is applied to the motor control circuit 30 in case that the magnetic head 13 is to be shifted to a next recording position. In response to this instruction, the circuit 30 causes the motor 1 to operate. When the shaft 4 makes one turn, the head feeding cam 12 turns to the above-stated predetermined degree. This moves the head carriage 14 either in the direction of arrow B or in the direction reverse thereto. Then, the charge cam 8 brings the T-shaped lever 21 back to the state as shown in FIG. 1. Accordingly, the lift lever 24 and the head carriage 14 come to be in a condition as shown in FIG. 2A and the head 13 is detached from the magnetic sheet 31.

The pushing action on one end 25c of the clamp lever 25 in the direction of arrow C indicated in FIG. 1 is arranged to be performed either every time a recording button is operated or as long as the recording button is in operation. Further, in the case of a reproducing apparatus, the pushing action is arranged to be performed as long as a reproducing button or the like is being operated or every time a head shift button or the like is operated.

Figure 3:
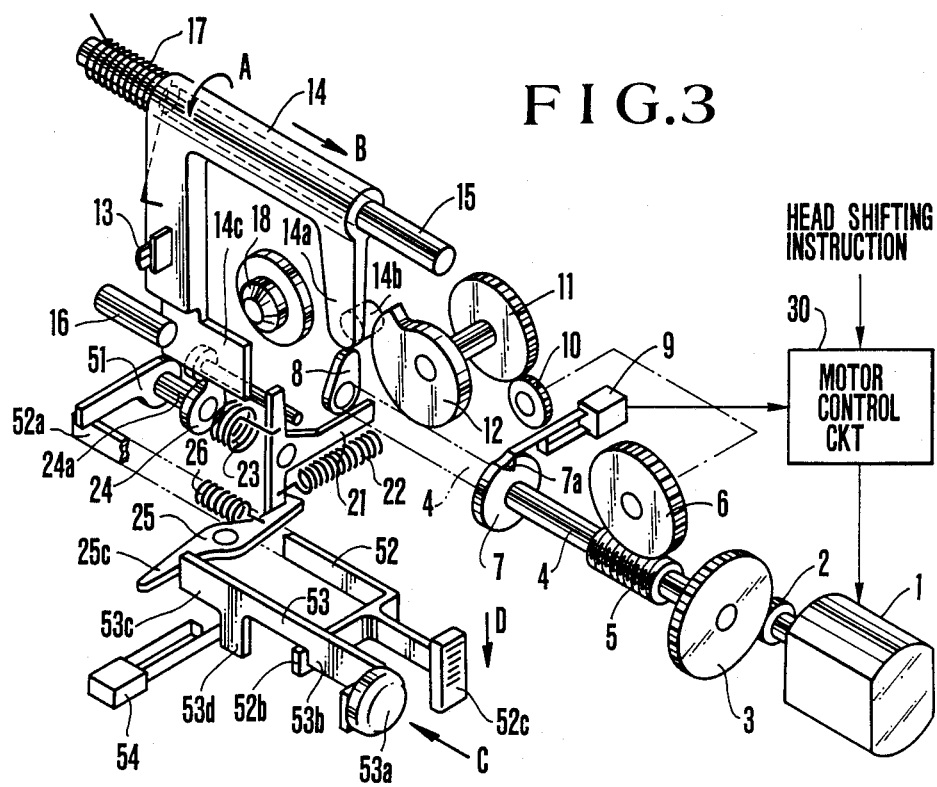
FIG. 3 is an oblique view showing the essential parts of another embodiment.
Figure 4A:
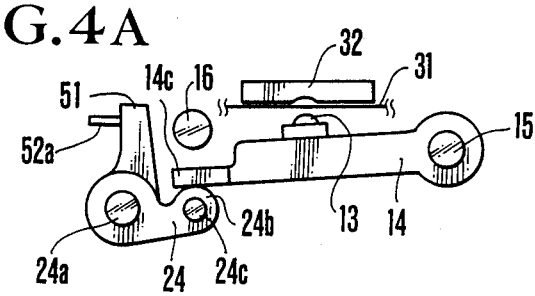
FIGS. 4A and 4B show the position of the head of the embodiment shown in FIG. 3 in its states of being out of contact and in contact with a magnetic sheet.

FIG. 3 shows another embodiment of this invention. In this case, the invention is applied to a magnetic recording camera using, for example, an image sensor such as a CCD. There have been proposed various magnetic recording cameras of the kind using an image sensor such as a CCD. However, the camera of this kind is generally arranged as follows: An optical image of an object is converted into an electrical image signal. The electrical signal is then processed into a form suited for magnetic recording (frequency modulated, for example). The processed signal then has, for example, a portion thereof corresponding to one field portion of a television signal recorded as a still picture image in one circle of recording tracks on a rotary magnetic recording sheet. In FIG. 3, parts 1 to 32 are similar to those shown in FIGS. 1, 2A and 2B and therefore the details of them are omitted from description below:

Referring to FIG. 3, a turning lever 51 is provided on the shaft 24a of the lift lever 24 and is arranged in one body therewith. A shutter release lever 53 of the camera is provided with a shutter release button 53a which is arranged at one end of the lever 53 to permit a pressing operation on the lever 53. The lever 53 is further provided with an engaging part 53b for engaging with a release lock lever 52 which will be described later herein; a contact pushing part 53d for actuating a trigger switch 54 which is arranged to generate a recording instruction signal; and an end part 53c for actuating the clamp lever 25, which has already been described with reference to FIG. 1. The release lock lever 52 is provided with an end part 52a which is arranged to engage with the above-stated lever 51; an engaging end 52b which is arranged to engage with the engaging part 53b of the release lever 53; and an external operation part 52c. Under the condition as illustrated in FIG. 3, the release button 53a cannot be pushed inward in the direction of arrow C. Further, under the condition of FIG. 3, the lift lever 24 is, as shown in FIG. 4A, in the same state as in the case of FIG. 2A. The turning lever 51 and the end part 52a of the release lock lever 52 are in contact with each other also as shown in FIG. 4A.

Figure 4B:
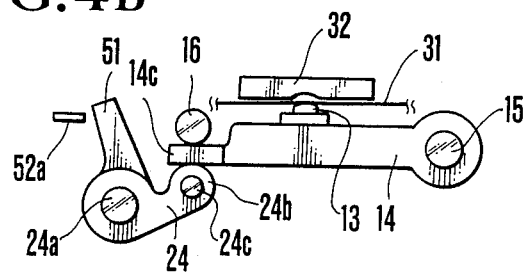

For a release operation of the camera, when the external operation part 52c of the release lock lever 52 is first moved in the direction of arrow D, the engaging end 52b of the release lock lever 52 is disengaged from the engaging part 53b of the release lever 53. The release lever 53 becomes pushable in the direction of arrow C. Then, the end part 52a of the release lock lever 52 is also disengaged from the turning lever 51. When the release button 53a is pushed in the direction of arrow C under this condition, the end part 53c of the lever 53 first comes to push the end part 25c of the clamp lever 25. The clamp lever 25 is disengaged from the lever 21. The magnetic head 13 then comes into contact with the magnetic sheet 31 in the same manner as in the case of FIG. 1, as shown in FIG. 4B. Following this, the contact pushing part 53d of the release lever 53 causes the trigger switch 54 to close. The switch 54 produces a recording instruction signal. Upon completion of recording on the magnetic sheet 31, the motor control circuit 30 causes the motor 1 to operate in response to a head shifting instruction. The magnetic head 13 is thus shifted in the same manner as in the case of FIG. 1.

In case that a picture taking operation is suspended after the magnetic head 13 has been brought into contact with the magnetic sheet 31 by pushing the release button halfway, the magnetic head 13 can be brought out of contact with the magnetic sheet 31 by turning the release lock lever 52 in the direction reverse to the direction of arrow D to bring the lever 52 into a release locking state. With the lever 52 brought into that state, the end part 52a of the lever 52 causes the lever 51 to turn clockwise to bring the lift lever 24 into the state as shown in FIG. 4A to move the head 13 away from the sheet 31. After that, of course, there obtains the condition of FIG. 4B if the release lock is again unlocked.

In the case of FIG. 3, the clamp lever 25 is arranged to be operated by the release lever 53. However, in the case of a magnetic recording camera having an iris, a movable mirror for a single-lens reflex view finder and/or an automatic focusing device, the clamp lever 25 may be arranged to operate in response to the operation of one of those members for the picture-taking.

In accordance with this invention, as described in detail in the foregoing, a flexible record bearing medium can be effectively prevented from being deformed by the head with a relatively simple structural arrangement without recourse to any additional drive source for that purpose. The invention is therefore highly advantageous for a recording and/or reproducing apparatus using a flexible record bearing medium.

The two embodiments of this invention which have been described in the foregoing may be modified, for example, in the following manner: The spring 17 is arranged to urge the head carriage 14 to turn clockwise on the shaft 15 in the direction reverse to the direction of arrow A indicated in FIGS. 1 and 3. On the other hand, the lift lever 24 is arranged to act on the front side of one end 14c of the head carriage 14, instead of the reverse side thereof. The head carriage 14 which is in the state as shown in FIG. 2B or 4B under the urging force of the spring 17 is thus arranged to be brought into the retracted state as shown in FIG. 2A or 4A by the clockwise turn of the lift lever 24 which follows the clockwise turn of the T-shaped lever 21. This modification permits the spring 22 to be weaker than the spring 17.

For further simplification, the embodiments may be modified as follows: While the spring 17 is arranged to urge the head carriage 14 to turn clockwise on the shaft 15, in the direction reverse to the direction of arrow A, the T-shaped lever 21 is arranged to have its arm part 21d act directly on the front side of the end 14c of the head carriage 14. Then, the head carriage 14 which is in the state of FIG. 2B or 4B under the urging force of the spring 17 is arranged to be brought into the state of FIG. 2A or 4A against the force of the spring 17 by the third arm part 21d of the T-shaped lever 21 when the lever 21 turns clockwise. This modification obviates the necessity of the clamp lever 24 and the torsion spring 23.

As apparent from the above, the present invention is not limited in its application to the specific embodiments described but may be otherwise variously embodied within the spirit or scope of the following claims.

What is claimed is:

1. A head control mechanism for a recording and/or reproducing apparatus comprising:
    (A) a recording and/or reproducing head arranged opposite to a recording surface of a recording medium; and
    (B) head control means for moving said head along the recording surface of the medium in a first direction and for shifting said head into a shifted condition away from the recording surface of the medium in a second direction relative to the moving of said head in said first direction said head control means being arranged so as to repetitively move said head in said second direction every time said head is moved in said first direction for a predetermined recording area.

2. The apparatus according to claim 1, wherein the medium is of rotary type; and the apparatus further comprises:
    rotation means for rotating the medium relative to said head.

3. The apparatus according to claim 2, wherein the medium is disc-shaped.

4. The apparatus according to claim 1, wherein said head control means is arranged to shift said head from the medium when the head is moved by said head control means.

5. The apparatus according to claim 4, wherein said holding means is arranged to hold said head in the shifted condition until an operation for signal recording and/or reproduction is performed.

6. The apparatus according to claim 5, further comprising:
release means for releasing the shifted condition of said head mechanism, said release means being responsive to the operation of signal recording and/or reproduction.

7. The apparatus according to claim 1, wherein said is arranged to hold said head in the shifted condition until an operation for signal recording and/or reproduction is performed.

8. The apparatus according to claim 7, further comprising:
release means for releasing the shifted condition of said head, said release means being responsive to the operation of signal recording and/or reproduction.

9. The apparatus according to claim 1, wherein said holding means is arranged to hold said head in the shifted condition; and the apparatus further comprises:
release means for releasing the shifted condition of the head.

10. The apparatus according to claim 1, wherein said head control means includes:
a carriage guide;
a head carriage for carrying said head, said carriage being guided by said guide and rotatable about the guide;
head moving means driven by said drive source to move said carriage along said guide; and
head shifting means being arranged to rotate said carriage about said guide to shift said head from the medium.

11. The apparatus according to claim 10, wherein said head shifting means includes:
an urging member for urging said head carriage to rotate about said carriage guide to shift said head from the medium;
pressure means for pressing said carriage against said urging member to have said head approach to the medium; and
release means for releasing the pressing of said carriage by said pressure means, said release means being operative with the driving force of said drive source.

12. The apparatus according to claim 10, wherein said head moving means further includes an urging member for urging said head carriage to rotate about said guide to have said head approach to the medium; and said head shifting means is arranged to rotate said carriage against said urging member to shift said head from the medium.

13. A head control mechanism according to claim 1, and further comprising a drive source for driving said head control means, and holding means for holding said head in the shifted condition every time said head is moved to the shifted condition by said head control means.

14. A head control mechanism for a recording and/or reproducing apparatus, comprising:
(A) a head for recording signals on and/or reproducing signals from a disc-shaped medium, said head being arranged opposite to a recording surface of the medium;
(B) a spindle for rotating the medium relative to said head; and
(C) head control means for moving said head parallel to the surface of the medium in a first direction and for shifting said head into a shifted condition away from the surface of the medium in a second direction relative to the moving of said head in said first direction, said head control means being arranged so as to repetitively move said head in said second direction every time said head is moved in said first direction for a predetermined recording area.

15. The apparatus according to claim 14, wherein said head control means is arranged to shift said head from the medium when the head is moved by said head control means.

16. The apparatus according to claim 15, wherein said head holding means is arranged to hold said head in the shifted condition until an operation for signal recording and/or reproduction is performed.

17. The apparatus according to claim 16, further comprising:
release means for releasing the shifted condition of said head, said release means being responsive to the operation of signal recording and/or reproduction.

18. The apparatus according to claim 14, wherein said head holding means is arranged to hold said head in the shifted condition until an operation for signal recording and/or reproduction is performed.

19. The apparatus according to claim 18, further comprising:
release means for releasing the shifted condition of said head, said release means being responsive to the operation of signal recording and/or reproduction.

20. The apparatus according to claim 14, wherein said head holding means is arranged to hold said head in the shifted condition; and the apparatus further comprises:
release means for releasing the shifted condition of the head.

21. The apparatus according to claim 14, wherein said head moving mechanism includes:
a carriage guide;
a head carriage for carrying said head, said carriage being guided by said guide and rotatable about the guide;
moving means driven by said drive source to move said carriage along said guide; and
head shifting means being arranged to rotate said carriage about said guide to shift said head from the medium.

22. The apparatus according to claim 21, wherein said head moving means further includes an urging member for urging said head carriage to rotate about said guide to have said head approach to the medium; and said head shifting means is arranged to rotate said carriage against said urging member to shift said head from the sheet.

23. The apparatus according to claim 21, wherein said head shifting means includes;

an urging member for urging said head carriage to rotate about said carriage guide to shift said head from the medium;

pressure means for pressing said carriage against said urging member to have said head approach to the medium; and release means for releasing the pressing of said carriage by said pressure means, said release means being operative with the driving force of said drive source.

24. A head control mechanism according to claim 14, and further comprising a drive source for driving said head control means, and head holding means for holding said head in the shifted condition regardless of movement of said control means.

25. A head control mechanism for a recording and/or reproducing apparatus, comprising:
 (A) a recording and/or reproducing head arranged opposite to a recording surface of a recording medium;
 (B) head control means for moving said head along the recording surface of the medium in a first direction, and for shifting said head into a shifted condition away from the recording surface of the medium in a second direction relative to the moving of said head in said first direction, said head control means being arranged so as to repetitively move said head in said second direction every time said head is moved in said first direction for a predetermined recording area;
 (C) holding means for holding said head in the shifted condition every time said head is moved to the shifted condition by said head control means;
 (D) releasing means for releasing said shifted condition of said head; and
 (E) preventing means for preventing an operation of said releasing means.

26. A head control mechanism for a recording and/or reproducing apparatus, comprising:
 (A) a recording and/or reproducing head arranged opposite to a recording surface of a recording medium;
 (B) head control means for moving said head in a first direction along the recording surface of said recording medium at predetermined pitches and for shifting said head in a second direction upward and downward relative to said recording surface every time said head is moved in the first direction;
 (C) locking means for locking said head in a position shifted away from said recording surface every time said head is shifted away from said surface by said head control means; and
 (D) releasing means for releasing the locked state of said locking means so as to allow loading of said head onto said recording surface so as to enable recording or reproducing by said head.

27. A head control mechanism according to claim 26, wherein said recording medium is a disc-shaped recording medium, said head being arranged to effect recording or reproducing on concentric circular recording tracks on the surface of the recording medium.

28. A head control mechanism according to claim 27, wherein said releasing means is responsive to the operation of signa recording and/or reproduction.

29. A mechanism according to claim 27, wherein said head control means includes:
 a guide carriage;
 a head carriage provided so as to carry said head and so as to be guidable by, and rotatable about said guide;
 head moving means driven by a drive source so as to move said carriage along said guide; and
 head shifting means for rotating said carriage about said guide so that said head is shifted from the medium.

30. A head control mechanism according to claim 29, wherein said head shifting means includes:
 an urging member provided so as to urge said head carriage to rotate about said carriage guide so as to shift said head from the medium;
 pressure means for pressing said carriage against said urging member so that said head approaches to the medium; and
 release means for releasing the pressing of said carriage by said pressure means, said release means being driven by the drive source.

31. A head control mechanism according to claim 29, wherein said head control means further includes an urging member provided so as to urge said head cartridge to rotate about said guide so that said head confronts the medium, said head shifting means being arranged to rotate said cartridge against said urging member to shift said head from the medium.

* * * * *